United States Patent
Kunii

[19]

[11] Patent Number: 6,015,359
[45] Date of Patent: Jan. 18, 2000

[54] BELT TYPE CONTINUOUSLY VARIABLE TRANSMISSION

[75] Inventor: Rikiya Kunii, Wako, Japan

[73] Assignee: Honda Giken Kogyo Kabushiki Kaisha, Tokyo, Japan

[21] Appl. No.: 09/039,267

[22] Filed: Mar. 16, 1998

[30] Foreign Application Priority Data

Mar. 17, 1919 [JP] Japan ................................. 9-062768

[51] Int. Cl.$^7$ ................................................. F16H 59/00
[52] U.S. Cl. .................................. 474/18; 474/28; 474/91
[58] Field of Search ............................... 474/91, 28, 18

[56] References Cited

U.S. PATENT DOCUMENTS

| | | | |
|---|---|---|---|
| 4,534,243 | 8/1985 | Yokoyama et al. | 474/18 X |
| 4,753,627 | 6/1988 | Kawamoto | 474/18 |
| 4,881,925 | 11/1989 | Hattori | 474/18 |
| 5,176,579 | 1/1993 | Ohsono et al. | 474/18 X |
| 5,628,700 | 5/1997 | Yamada et al. | 474/28 X |

FOREIGN PATENT DOCUMENTS 7-174193  7/1995  Japan .

*Primary Examiner*—Tamara L. Graysay
*Assistant Examiner*—Marcus Charles
*Attorney, Agent, or Firm*—Nikaido, Marmelstein, Murray & Oram LLP

[57] ABSTRACT

In a belt type continuously variable transmission, the oil for the canceler oil chamber and the oil for lubricating the endless belt are commonly used to reduce the required amount of oil to be supplied. The gear shift control oil is supplied to the pulley oil chamber of the driven pulley mounted on the output shaft of the belt type continuously variable transmission through a feed pipe, oil holes of a plug, an oil groove, oil holes of the output shaft and oil holes of the movable pulley half. The lubricating oil supplied to a first in-shaft oil chamber of the output shaft is further supplied through the oil holes of the output shaft to the canceler oil chamber of the driven pulley and also from the first in-shaft oil chamber through a throttle in the plug, the second in-shaft oil chamber and the oil holes of the output shaft to the endless belt.

6 Claims, 7 Drawing Sheets

BELT TYPE CONTINUOUSLY VARIABLE TRANSMISSION

BACKGROUND OF THE INVENTION

1. Field of the Invention

The present invention relates to a belt type continuously variable transmission in which oil is supplied to a pulley oil chamber, a canceler oil chamber and an endless belt through an oil passage formed in a shaft supporting the pulleys.

2. Description of the Prior Art

A belt type continuously variable transmission such as disclosed in Japanese Patent Application Laid-open No. 7-174193 is known, in which an endless belt is passed or reeved around a drive pulley on an input shaft and a driven pulley on an output shaft. The speed change ratio or gear shift ratio is changed by increasing the groove width of one of the drive and driven pulleys and reducing the groove width of the other.

In such a belt type continuously variable transmission, an oil path is provided to supply oil to the pulley oil chamber to change the groove width of the pulley, another oil path is provided to supply oil to the canceler oil chamber to cancel the centrifugal oil pressure produced in the pulley oil chamber, and a further oil path is provided to supply oil for lubricating the endless belt. The oil paths are formed as separate hydraulic systems in the input shaft and the output shaft. Having multiple oil paths simultaneously in the shafts gives rise to a problem of requiring a large-capacity oil pump to deliver an increased amount of oil required.

SUMMARY OF THE INVENTION

The present invention has been accomplished under the above circumstance and its objective is to use oil commonly for the canceler oil chamber and for the endless belt lubrication, to reduce the required amount of oil to be delivered.

According to the invention, oil is supplied to the pulley oil chamber and the canceler oil chamber through a first oil path and a second oil path, respectively, both formed in the inner circumferential surface of the shaft that supports a pulley of the belt type continuously variable transmission. The oil that exits the canceler oil chamber, passes through a throttle and is discharged from an open end of the oil path, lubricating the endless belt. In this way, the oil for the canceler oil chamber and the oil for endless belt lubrication are commonly used, thus reducing the required amount of oil to be supplied.

A throttle in the second oil path is formed by using an oil transfer member positioned in the interior of the shaft that forms the first oil path. This construction reduces the number of parts constituting the first and second oil paths and machining time required to machine the paths.

DETAILED DESCRIPTION OF THE PREFERRED EMBODIMENTS

Figure 1:
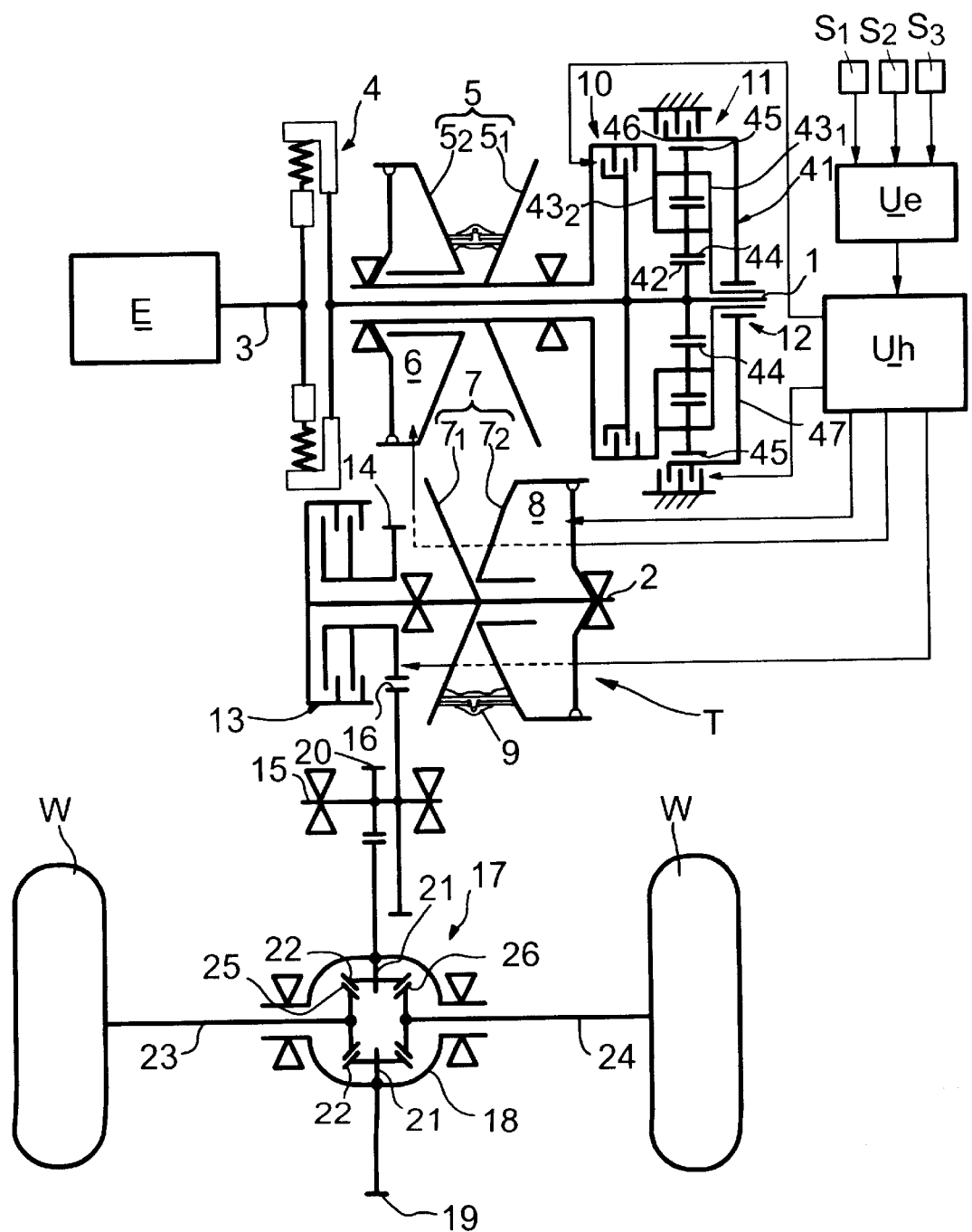
FIG. 1 is an overall schematic diagram of the belt type continuously variable transmission according to a first embodiment of the present invention.

As shown in FIG. 1, the belt type continuously variable transmission T for automobiles has an input shaft 1 and an output shaft 2 arranged parallel to each other. The right end of a crank shaft 3 of an engine E is connected to the left end of the input shaft 1 through a damper 4 with a flywheel.

A drive pulley 5 supported on the input shaft 1, has a stationary pulley half $5_1$ rotatable relative to the input shaft 1 and a movable pulley half $5_2$ axially slidable relative to the stationary pulley half $5_1$. The movable pulley half $5_2$ can be moved by the hydraulic pressure acting on a pulley oil chamber 6 to change the groove width between the movable pulley half $5_2$ and the stationary pulley half $5_1$. A driven pulley 7 has a stationary pulley half $7_1$ formed integral with the output shaft 2 and a movable pulley half $7_2$ axially slidable relative to the stationary pulley half $7_1$. The movable pulley half $7_2$ can be moved by the hydraulic pressure acting on a pulley oil chamber 8 to change the groove width between the movable pulley half $7_2$ and the stationary pulley half $7_1$. An endless belt 9 passes around the drive pulley 5 and the driven pulley 7. The endless belt 9 comprises two strips of strap having a number of press pieces attached thereto.

A forward-reverse changeover mechanism 12 is provided at the right end of the input shaft 1. The forward-reverse changeover mechanism 12 is in the form of a planetary gear system comprising a forward clutch 10 that, when establishing a forward gear shift stage, engages to transmit the rotation of the input shaft 1 in the same direction as the input shaft rotation to the drive pulley 5, and a reverse brake 11 that, when establishing a reverse gear shift stage, engages to transmit the rotation of the input shaft 1 in a direction opposite the input shaft rotation to the drive pulley 5.

A startup clutch 13 provided at the left end of the output shaft 2, connects a first intermediate gear 14 relatively rotatably supported on the output shaft 2, to the output shaft 2. On an intermediate shaft 15 arranged parallel to the output shaft 2, is mounted a second intermediate gear 16 that meshes with the first intermediate gear 14. A third intermediate gear 20 mounted on the intermediate shaft 15, meshes with an input gear 19 provided to a gear box 18 of a differential 17. A pair of pinions 22 supported on the gear box 18 through pinion shafts 21, are meshed with side gears 25, 26 provided at the ends of a left axle 23 and a right axle 24, both relatively rotatably supported on the gear box 18. The other ends of the left axle 23 and the right axle 24 are mounted with drive wheels W, W.

An electronic control unit Ue receives signals from an accelerator opening sensor $S_1$, a car speed sensor $S_2$, and a reverse switch $S_3$ that detects when a shift select lever (not shown) selects a reverse range. Based on the signals from the sensors and switch, the electronic control unit Ue outputs a control signal to a hydraulic pressure control unit Uh, which controls the groove widths of the drive pulley 5 and driven pulley 7, that is, the gear shift ratio of the belt type continuously variable transmission T, the engagement condition of the forward clutch 10, the engagement condition of the reverse brake 11, and the engagement condition of the startup clutch 13.

Figure 2:
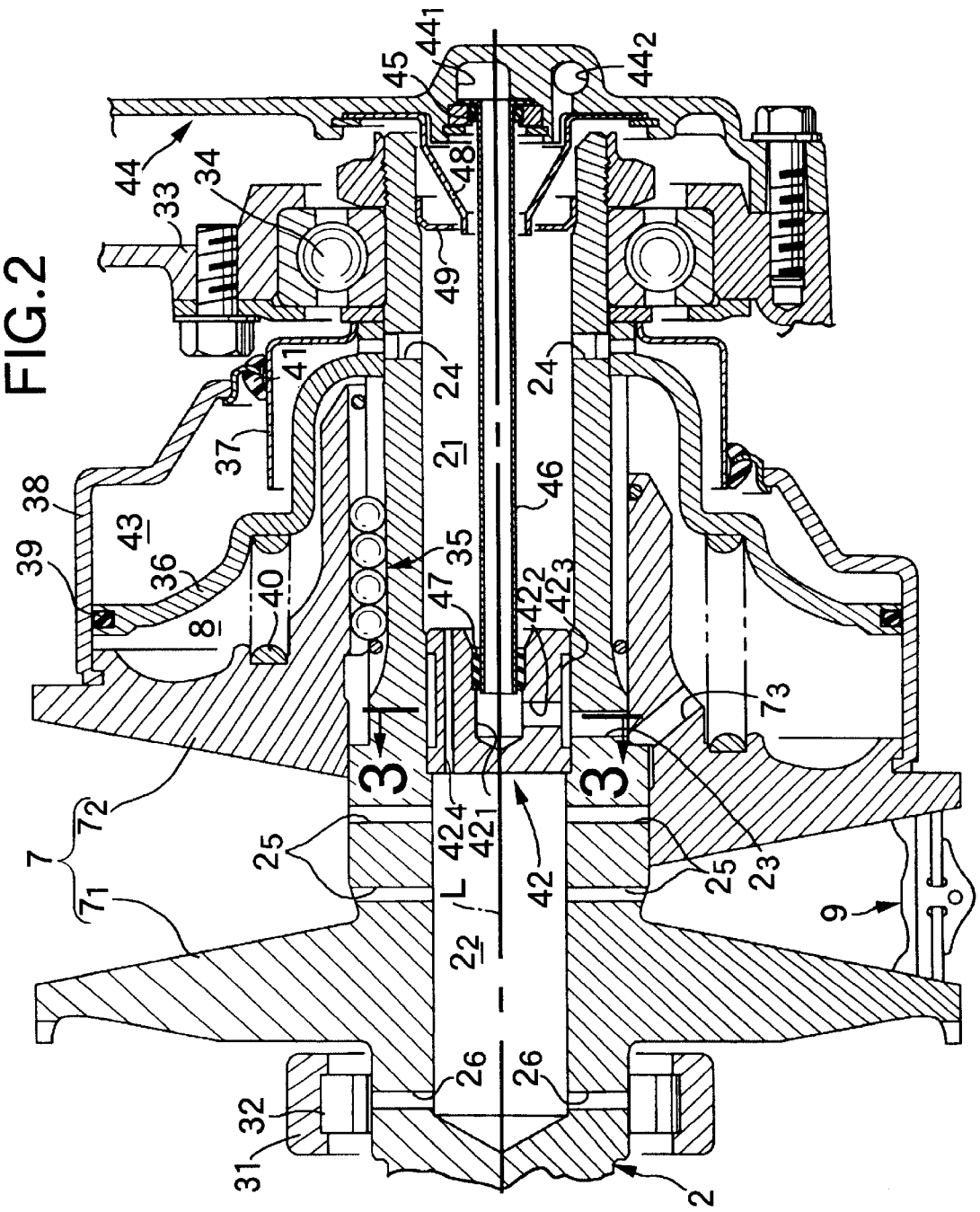
FIG. 2 is an enlarged view of an essential portion of FIG. 1.
Figure 3:
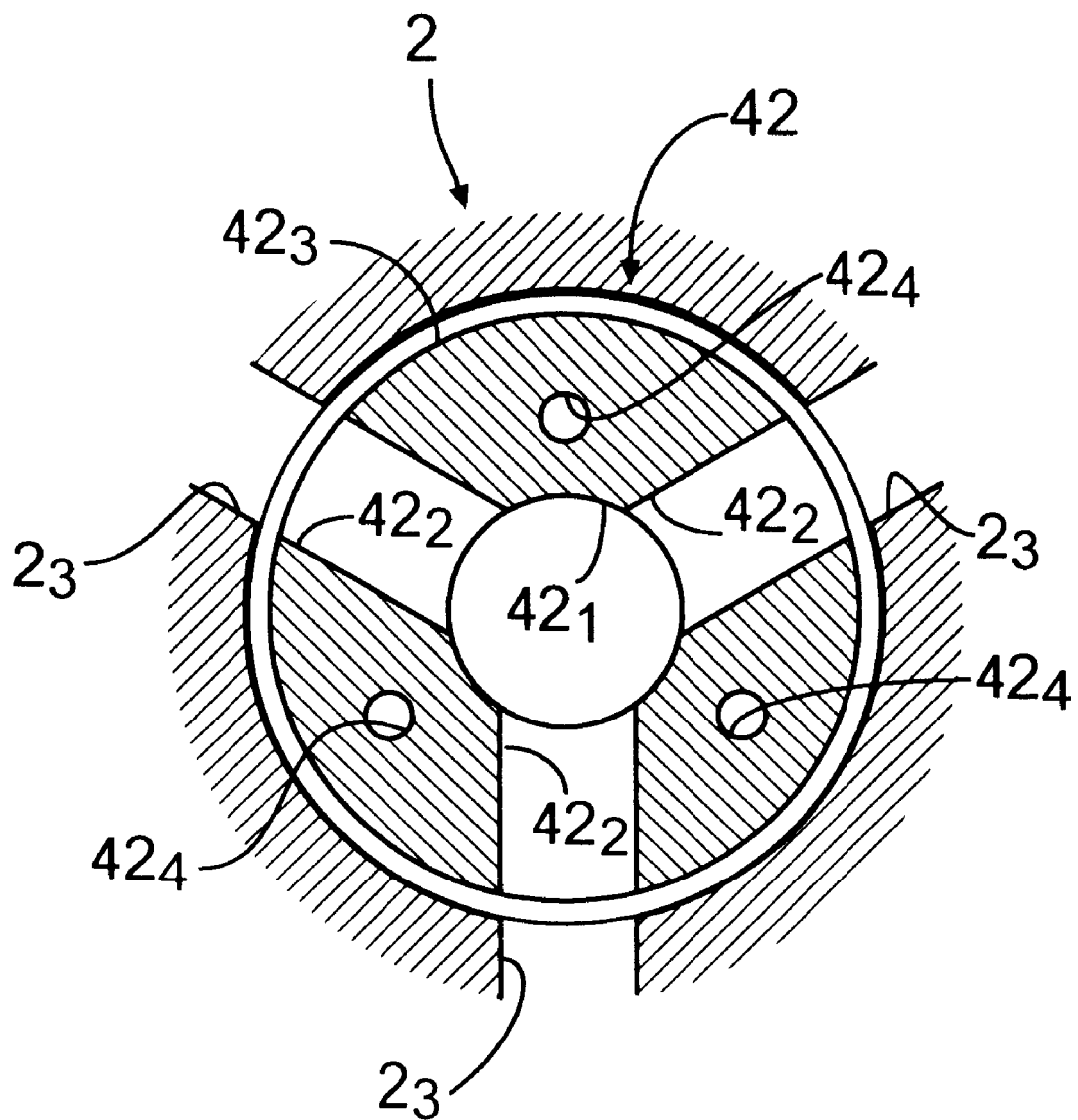
FIG. 3 is an enlarged cross section taken along the line 3—3 of FIG. 2.

Next, the construction of the driven pulley 7 will be described by referring to FIGS. 2 and 3. In FIG. 2 an upper half and a lower half of the driven pulley 7 with respect to an axis line L of the output shaft 2, are in an OD state and a LOW state in the gear shift ratio, respectively.

The output shaft 2 of the belt type continuously variable transmission T, is supported at its axially intermediate portion by a center casing 31 through a roller bearing 32 and at the right end portion by a right casing 33 through a ball bearing 34. The outer circumferential surface of the output shaft 2 is formed integral with the stationary pulley half $7_1$ of the driven pulley 7. The movable pulley half $7_2$ facing the right side surface of the stationary pulley half $7_1$ is supported on the output shaft through a ball spline 35 so that the movable pulley half $7_2$ can axially slide but not rotate relatively. A piston member 36 is securely fixed on the outer circumferential surface of the output shaft 2 so that the piston member 36 faces the right side surface of the movable pulley half $7_2$. Further, an inner cylinder member 37 is securely fixed on the outer circumferential surface of the output shaft 2 so that it faces the right side surface of the piston member 36.

An outer cylinder member 38 is secured to the right side surface of the circumferential part of the movable pulley half $7_2$. A seal member 39 provided to the outer circumference of the piston member 36, is in sliding contact with the outer cylinder member 38 to form the pulley oil chamber 8 defined by the movable pulley half $7_2$, the piston member 36 and the output shaft 2. A spring 40 for urging the movable pulley half $7_2$ toward the stationary pulley $7_1$, is compressed in the pulley oil chamber 8. A seal member 41 provided on the inner circumference of the outer cylinder member 38, is in sliding contact with the inner cylinder member 37 to form a canceler oil chamber 43 defined by the piston member 36, the outer cylinder member 38, the inner cylinder member 37 and the output shaft 2.

Inside the output shaft 2 there are formed a first in-shaft oil chamber $2_1$ in the form of a blind hole that opens at the right end surface, and a second in-shaft oil chamber $2_2$, both chambers are aligned coaxially along the axis line L. An oil transfer member, in the form of a plug 42 of a circular pillar in shape, is press-fitted in the output shaft 2 and secured at a stepped portion between these two in-shaft chambers, so that the plug 42 separates the first and second in-shaft chambers $2_1$, $2_2$. A right cover 44 connected to the right side surface of the right casing 33, has two oil paths $44_1$, $44_2$ formed therein. A feed pipe 46 whose right end is connected to the oil path $44_1$ through a seam member 45, extends toward the left inside of the first in-shaft oil chamber $2_1$, with its left end fitted through a seal member 47 into a blind oil hole $42_1$ formed at the center of the plug 42.

The plug 42 has three oil holes $42_2$ radially extending from the oil hole $42_1$ with 120 degrees apart from each other and an annular oil groove $42_3$ communicating with the outer ends of the oil holes $42_2$. The annular oil groove $42_3$ of the plug 42 communicates with the pulley oil chamber 8 through oil holes $2_3$, extending radially through the output shaft 2 and through an oil hole $7_3$ extending radially through a cylindrical portion of the movable pulley half $7_2$.

A funnel-shaped retainer 48 is secured to the right cover 44 so that it encloses the outer circumferential surface of the feed pipe 46. A ring-shaped retainer 49 is secured to the first in-shaft oil chamber $2_1$ of the output shaft 2 so that it encloses the circumferential surface of the left end portion of the funnel-shaped retainer 48. The first in-shaft oil chamber $2_1$ communicates with the oil path $44_2$ of the right cover 44 through a gap between the outer circumferential surface of the feed pipe 46 and the inner circumferential surface of the retainer 48 and also communicates with the outside of the output shaft 2 through a gap between these retainers 48, 49. The first in-shaft oil chamber $2_1$ communicates with the canceler oil chamber 43 through oil holes $2_4$ radially extending through the output shaft 2 and also communicates with the second in-shaft oil chamber $2_2$ through three throttles $42_4$ axially extending through the plug 42. Oil holes $2_5$ radially extending through the output shaft 2 from the second in-shaft oil chamber $2_2$, face the endless belt 9, and other oil holes $2_6$ extending radially through the output shaft 2 face the roller bearing 32.

Figure 4:
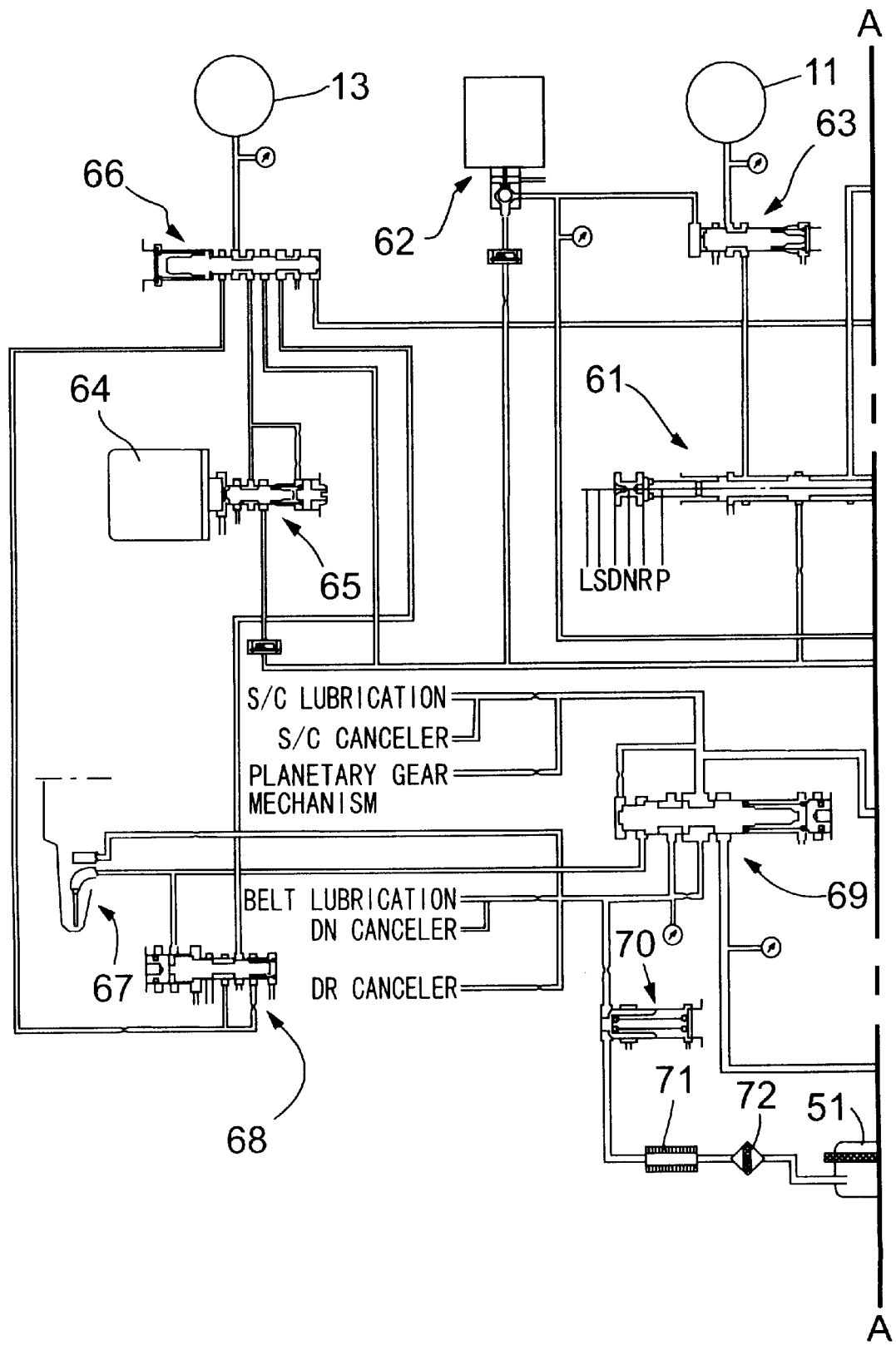
FIG. 4 is a first part of a diagram of the hydraulic circuit.
Figure 5:
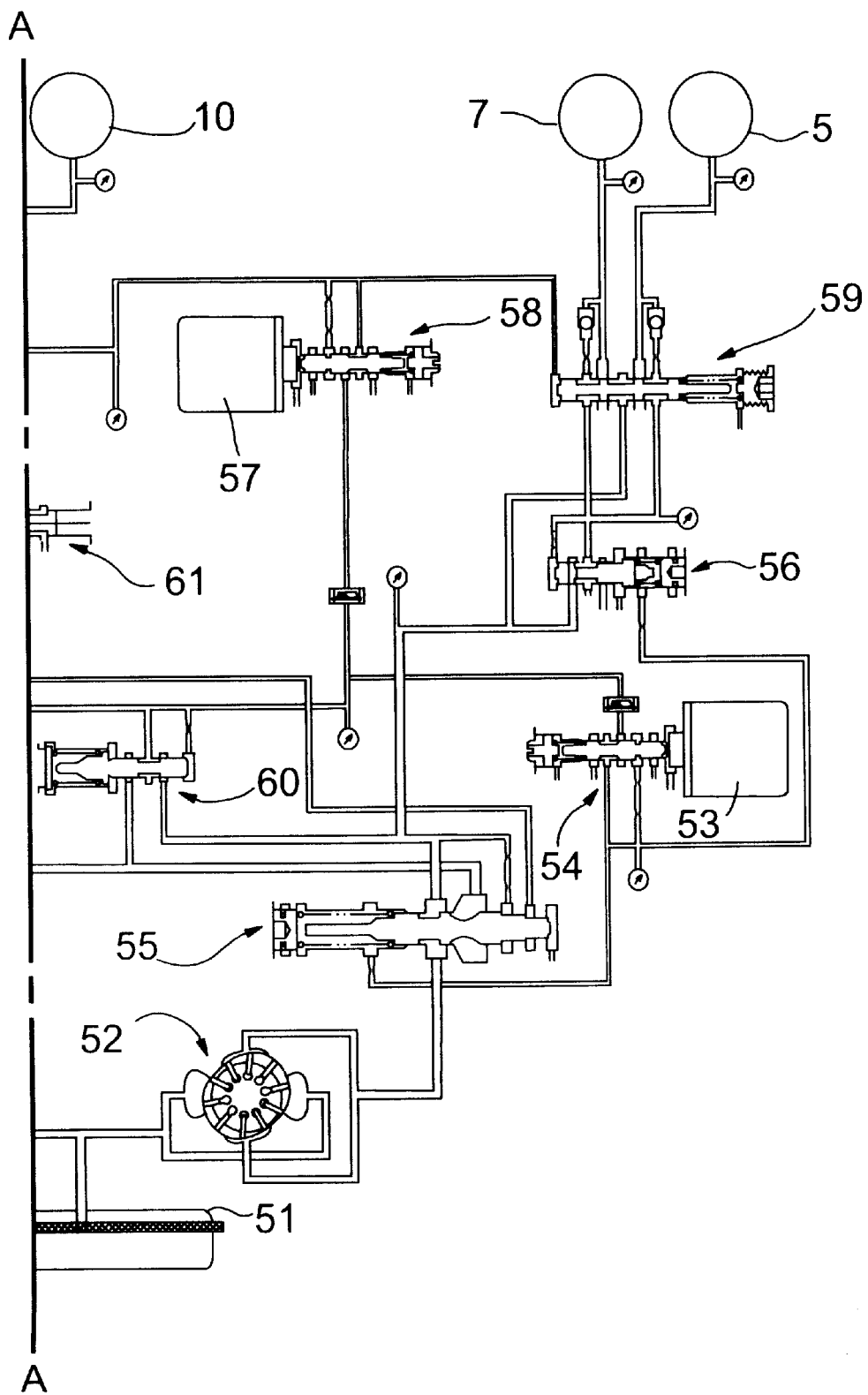
FIG. 5 is a second part of a diagram of the hydraulic circuit.

Next, by referring to FIGS. 4 and 5, the outline of the hydraulic circuit of the hydraulic pressure control unit Uh is described.

Oil pumped up from an oil tank 51 by an oil pump 52 is regulated in pressure by a PH regulator valve 55 and a PL regulator valve 56 connected to a PH-PL control valve 54 activated by a linear solenoid 53. The high pressure PH and the low pressure PL are supplied to the pulley oil chamber 6 of the drive pulley 5 and the pulley oil chamber 8 of the driven pulley 7, by a shift valve 59 connected to a shift control valve 58 operated by a linear solenoid 57. As a result, the differential pressure between the PH and PL pressures, increases or decreases the groove width of the drive pulley 5 and the driven pulley 7, thus changing the gear shift ratio.

The PH pressure output from the PH regulator valve 55 is reduced to a clutch pressure by a clutch pressure reduction valve 60 and then selectively supplied through a manual valve 61 operated by the driver, to the forward clutch 10 or reverse brake 11 of the forward-reverse changeover mechanism 12, for establishing the forward or reverse gear shift stages. To prevent the reverse gear shift stage from being established when the car is running forward, the supply of hydraulic pressure to the reverse brake 11 is cut off by a reverse inhibitor valve 63 that is operated by an inhibitor solenoid valve 62.

The clutch pressure output from the clutch pressure reduction valve 60, is transmitted to a startup clutch 13 through a startup clutch control valve 65 operated by a linear solenoid valve 64. A shift inhibitor valve 66 operated by the shift control valve 58 is connected between the startup clutch control valve 65 and the startup clutch 13, which, in the event of a failure of the hydraulic pressure control system, supplies a Pitot regulator pressure, obtained by regulating the oil pressure generated in a Pitot pipe 67 by a Pitot regulator valve 68, to the startup clutch 13 through the shift inhibitor valve 66, thus providing a backup.

Lubricating oil supplied from the PH regulator valve 55 is regulated in pressure by a lubrication control valve 69 and then used for lubrication of the startup clutch 13, for canceling the startup clutch 13, for lubrication of the planetary gear mechanism of the forward-reverse changeover mechanism 12, for lubrication of the endless belt 9, for canceling the driven pulley 7 and for canceling the drive pulley 5. A part of the oil supplied to the endless belt 9 and to the canceler oil chamber 43 of the driven pulley 7 is returned to the oil tank 51 through a cooler relief valve 70, an oil cooler 71 and a filter 72.

Next, the operation of the above embodiment will be explained.

When a forward range is chosen by a shift select lever, the electronic control unit Ue issues a control signal to engage the forward clutch 10, causing the input shaft 1 to be coupled integrally to the drive pulley 5. This is followed by the engagement of the startup clutch 13 causing the torque of the engine E to be transmitted through the input shaft 1, drive pulley 5, endless belt 9, driven pulley 7, output shaft 2 and differential 17 to the drive wheels W, W, for propelling the car forward. When a reverse range is chosen by a select lever, the electronic control unit Ue issues a control signal to engage the reverse brake 11, driving the drive pulley 5 in a direction opposite the rotation direction of the input shaft 1. Hence, the engagement of the startup clutch 13 drives the car rearwardly.

Once the car has started, the hydraulic pressure supplied to the pulley oil chamber 6 of the drive pulley 5 increases according to the signal from the electronic control unit Ue. As a result, the movable pulley half $5_2$ of the drive pulley 5 comes closer to the stationary pulley half $5_1$, increasing the effective radius of the drive pulley 5. At the same time, the oil pressure supplied to the pulley oil chamber 8 of the driven pulley 7 decreases, moving the movable pulley half $7_2$ away from the stationary pulley half $7_1$, reducing the effective radius of the driven pulley 7. Thus, the gear shift ratio of the belt type continuously variable transmission T changes continuously from the LOW side toward the OD side.

The control oil supplied through the shift valve 59 to the oil path $44_1$ of the right cover 44 flows through the feed pipe 46 installed in the first in-shaft oil chamber $2_1$ of the output shaft 2 into the oil hole $42_1$ of the plug 42, from which it passes through the radially extending oil holes $42_2$ and the circumferentially extending oil groove $42_3$. The oil is further supplied through the oil holes $2_3$ of the output shaft 2 and the oil holes $7_3$ of the movable pulley half $7_2$ of the driven pulley 7 into the pulley oil chamber 8.

The lubricating oil supplied through the lubrication control valve 69 to the oil path $44_2$ of the right cover 44 flows through the first in-shaft oil chamber $2_1$ of the output shaft 2 and the oil holes $2_4$ to the canceler oil chamber 43 of the driven pulley 7. It also flows from the first in-shaft oil chamber $2_1$ through the throttles $42_4$ of the plug 42 into the second in-shaft oil chamber $2_2$. The oil in the second in-shaft oil chamber $2_2$ flows out of the oil holes $2_5$ to lubricate the endless belt 9 passing around the driven pulley 7 and also out of the oil holes $2_6$ to lubricate the roller bearing 32 that supports the output shaft 2.

At time of a kickdown, an action that rapidly depresses the accelerator pedal to the floor, which causes a gear shift ratio of the belt type continuously variable transmission T to change from the OD side to the LOW side, the movable pulley half $7_2$ is moved toward left in FIG. 2 (toward the stationary pulley half $7_1$) by the action of the hydraulic pressure acting on the pulley oil chamber 8 of the driven pulley 7. As a result, the volume of the canceler oil chamber 43 decreases forcing the oil in the canceler oil chamber 43 to flow out into the first in-shaft oil chamber $2_1$. The oil is then supplied through the throttles $42_4$ of the plug 42, the second in-shaft oil chamber $2_2$ and the oil holes $2_5$ to the endless belt 9. In this way, by reusing the oil that was used for canceling the centrifugal oil pressure for lubrication of the endless belt 9, it is possible to reduce the required delivery capacity of the oil pump 52 and to thereby reduce its size. During the gear shift from the OD side to the LOW side when the contract surface pressure between the endless belt 9 and the driven pulley 7 increases, the amount of oil required for the lubrication of the endless belt 9 also increases. At this time, the reduction in the volume of the canceler oil chamber 43 automatically causes oil to be supplied to the endless belt 9.

Figure 6:
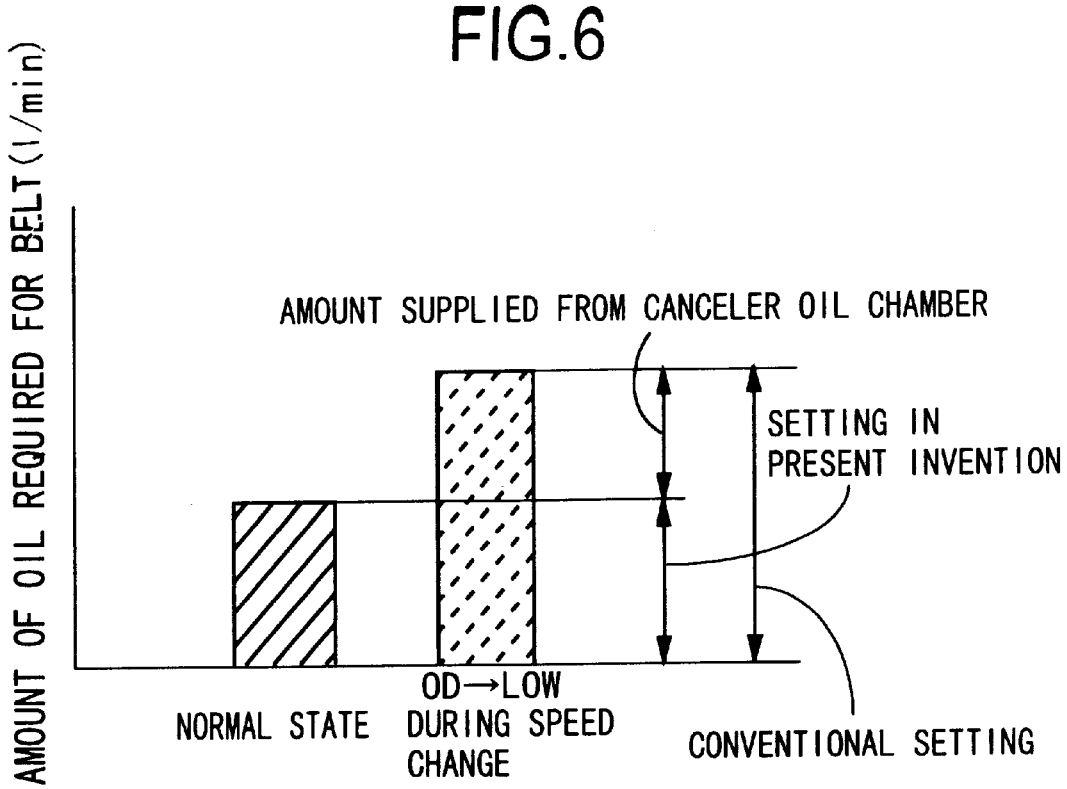
FIG. 6 is a graph showing the required amount of oil to be supplied to the endless belt.
Figure 7:
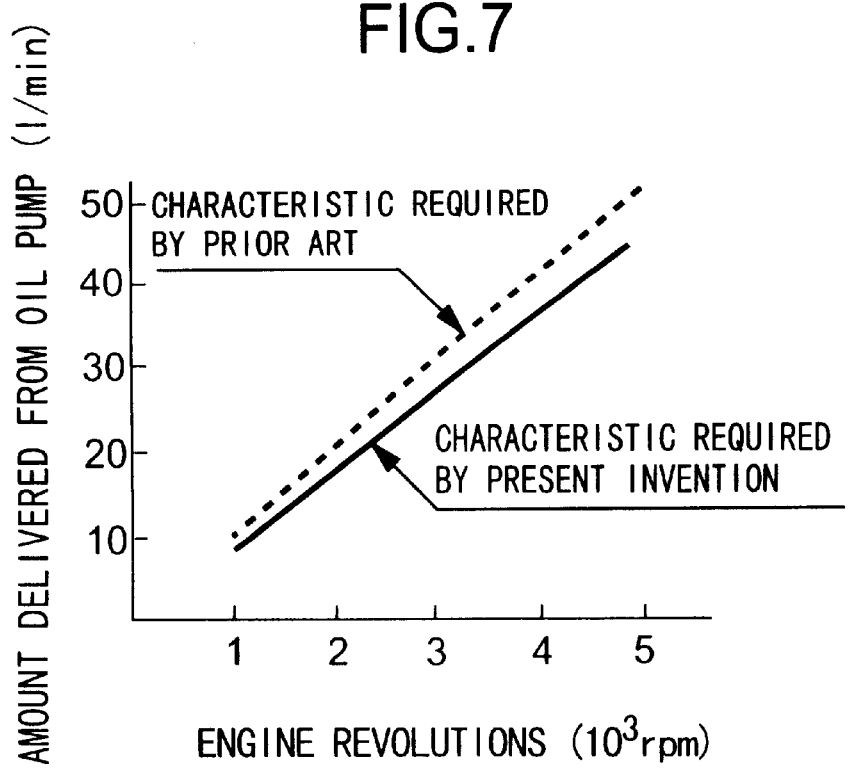
FIG. 7 is a graph showing the required amount of oil to be delivered by an oil pump.

In prior art, the amount of oil to be supplied for lubrication of the endless belt 9 has been determined so as to meet the amount of oil required at the time of a gear shift from the OD side to the LOW side, which is the most stringent condition, as shown in FIG. 6. With the present invention, however, even when the amount of oil to be supplied is set to be what is required during the normal state (other than the gear shift from the OD side to the LOW side), the canceler oil chamber 43 supplies oil to overcome any shortage during the gear shift, so that the endless belt 9 can be reliably lubricated while making the capacity of the oil pump 52 smaller than that of the prior art, as shown in FIG. 7.

Because the oil holes $42_1$ and $42_2$ and oil groove $42_3$, that form a part of the oil paths for supplying the control oil to the pulley oil chamber 8 of the driven pulley 7, and the throttles $42_4$ for supplying lubricating oil to the endless belt 9 and the roller bearing 32, are formed in the common plug 42, it is possible to form two oil path systems easily while minimizing the number of parts and machining processes.

While in the embodiment described above, the invention is applied to the output shaft 2 side, it can also be applied to the input shaft 1 side. In this embodiment, the oil for lubricating the endless belt 9 is supplied from the right side of the output shaft 2 through the throttles $42_4$ of the plug 42. In addition to being supplied from the right side of the output shaft 2, the oil may also be supplied to the endless belt 9 from the left side of the output shaft 2.

Figure 8:
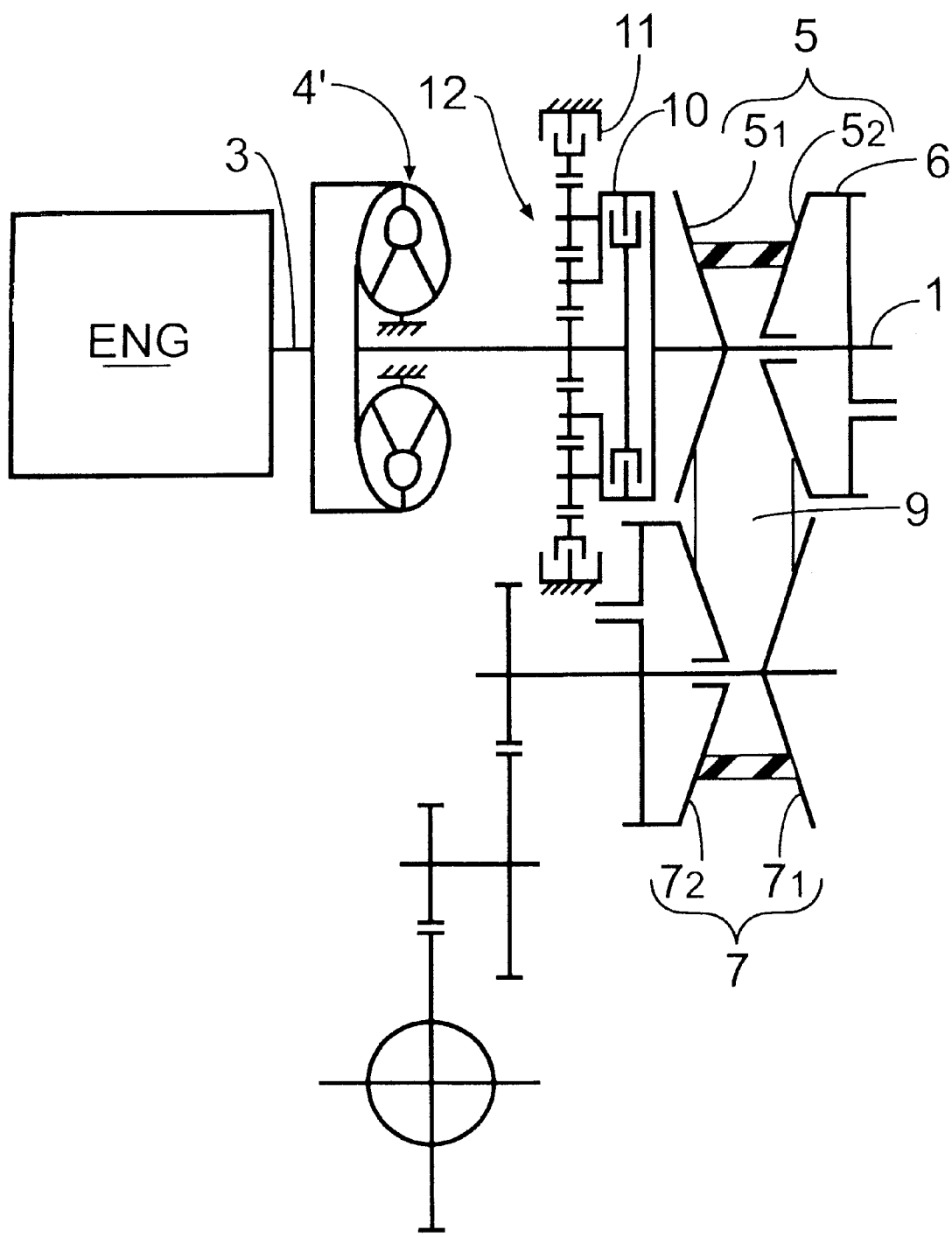
FIG. 8 is a skeleton drawing of a belt type continuously variable transmission according to a second embodiment of the present invention.

FIG. 8 shows a second embodiment of the present invention. In the second embodiment, a torque converter is disposed between an input shaft 1 supporting a drive pulley 5 and an engine E. As is apparent when comparing FIG. 1 (the first embodiment) and FIG. 8, while the drive pulley 5 in FIG. 1 is provided on the sleeve which fits on the outer periphery of the input shaft 1, the drive pulley 5 in FIG. 8 is directly supported on the input shaft and hence, the structure of oil paths in the output shaft 2 shown in FIG. 2 can be applied to the input shaft 1 in FIG. 8 as it is.

As described above, the present invention can be applied not only to the output shaft but to the input shaft in the belt type continuously variable transmission.

According to the present invention, the belt type continuously variable transmission has first and second oil paths formed in at least one of the input and output shafts, the first oil path supplying oil to the pulley oil chamber of the pulley supported on the shaft and the second oil path supplying oil to the canceler oil chamber of the pulley. The second oil path communicates with an oil path open end through a throttle to lubricate the endless belt with oil discharged from the oil path open end. Hence, when the pulley groove width decreases and the pulley clamps the endless belt, the lubricating oil discharged from the canceler oil chamber is supplied though the throttle to the endless belt in addition to the normally supplied lubricating oil, thus effectively lubricating the endless belt and enhancing its durability. In this way, by using the oil in the canceler oil chamber in lubricating the endless belt, the required amount of oil to be supplied can be reduced while enhancing the durability of the endless belt.

Further, the end of the feed pipe is connected to the oil transfer plug fitted in the inner circumference of the shaft to form the first oil path, and the oil transfer plug is formed with a throttle of the second oil path. This makes it possible to use the oil transfer plug, which forms the first oil path, to form the throttle of the second oil path, thereby reducing the number of parts making up the first and second oil paths and machining manhours.

The embodiments of this invention have been described in detail. It is noted that various modifications may be made without departing from the spirit of the invention.

It is claimed:

1. A continuously variable transmission, comprising:

an input shaft;

an output shaft;

a drive pulley mounted on said input shaft, the drive pulley having a stationary pulley half and a movable pulley half, wherein said drive pulley has a variable groove width;

a drive pulley mounted on said output shaft, the drive pulley having a stationary pulley half and a movable pulley half, wherein said drive pulley has a variable groove width;

an endless belt reeved around said drive pulley and said driven pulley;

pulley oil chambers to activate said movable pulley halves, respectively;

canceler oil chambers formed adjacent to said pulley oil chambers, respectively;

a first oil path and a second oil path formed inside at least one of said input shaft and said output shaft, the first oil path supplying oil to said pulley oil chamber of said pulley supported on said at least one of said input shaft and said output shaft, and the second oil path supplying oil to said canceler oil chamber of said pulley;

a throttle; and at least one oil path open end, wherein the second oil path communicates with said at least one oil path open through said throttle to lubricate said endless belt, with the oil that is discharged from said canceler oil chamber of said pulley through said at least one oil path open end by a reduction in volume of said canceler oil chamber of said pulley.

2. A continuously variable transmission according to claim 1, including an oil transfer member fitted in an inner circumference of said at least one of said input shaft and said output shaft and a feed pipe connected at an end thereof to said oil transfer member to form the first oil path, and wherein said oil transfer member includes said throttle of the second oil path.

3. A continuously variable transmission comprising:

an input shaft;

an output shaft, wherein said output shaft has first and second in-shaft oil chambers;

a drive pulley mounted on said input shaft, the drive pulley having a stationary pulley half and a movable pulley half, wherein said drive pulley has a variable groove width;

a drive pulley mounted on said output shaft, the driven pulley having a stationary pulley half and a movable pulley half, wherein said driven pulley has a variable groove width;

an endless belt reeved around said drive pulley and said driven pulley;

pulley oil chambers to activate said movable pulley halves;

canceler oil chambers formed adjacent to said pulley oil chambers;

a first oil path and a second oil path formed inside said output shaft, the first oil path supplying oil to said pulley oil chamber of said driven pulley supported on said output shaft, and the second oil path supplying oil to said canceler oil chamber of said driven pulley;

a throttle extending between the first and second in-shaft oil chambers; and at least one oil path open end extending from said second in-shaft oil chamber to a space between said stationary pulley half and said movable pulley half, wherein the second oil path communicates with the at least one oil path open end to lubricate said endless belt, in a space between said stationary pulley half and said movable pulley half, with the oil that is discharged from said canceler oil chamber of said driven pulley through said at least one oil path open end by a reduction in volume of said canceler oil chamber of said driven pulley.

4. A continuously variable transmission according to claim 3, including an oil transfer member fitted in an inner circumference of the output shaft between the first and second in-shaft oil chambers and a feed pipe connected to said oil transfer member to form the first oil path, and wherein said oil transfer member includes said throttle of the second oil path.

5. A continuously variable transmission according to claim 4, including an oil path connecting said feed pipe and said pulley oil chamber.

6. A continuously variable transmission according to claim 5, including an oil path connecting said feed pipe and said pulley oil chamber includes a portion passing through said oil transfer member.

* * * * *